US007734070B1

(12) United States Patent
Sharma et al.

(10) Patent No.: US 7,734,070 B1
(45) Date of Patent: Jun. 8, 2010

(54) METHOD AND SYSTEM FOR IMMERSING FACE IMAGES INTO A VIDEO SEQUENCE

(76) Inventors: Rajeev Sharma, 2391 Shagbark Ct., State College, PA (US) 16803; Namsoon Jung, 202 Jacks Mill Dr. Apt. 10, Boalsburg, PA (US) 16827

( * ) Notice: Subject to any disclaimer, the term of this patent is extended or adjusted under 35 U.S.C. 154(b) by 1921 days.

(21) Appl. No.: 10/738,453

(22) Filed: Dec. 16, 2003

Related U.S. Application Data

(60) Provisional application No. 60/437,566, filed on Dec. 31, 2002.

(51) Int. Cl.
*G06K 9/00* (2006.01)
(52) U.S. Cl. .......................... 382/118; 382/190; 382/276
(58) Field of Classification Search ................ 382/118, 382/190, 276, 282–287; 358/537; 715/704–707; 725/32–35
See application file for complete search history.

(56) References Cited

U.S. PATENT DOCUMENTS

| | | | | |
|---|---|---|---|---|
| 4,305,131 | A | 12/1981 | Best | 364/521 |
| 4,569,131 | A | 2/1986 | Falk | 364/521 |
| 4,975,960 | A | 12/1990 | Petajan | 381/43 |
| 5,012,522 | A | 4/1991 | Lambert | 382/2 |
| 5,715,325 | A | 2/1998 | Bang et al. | 382/118 |
| 5,816,823 | A | 10/1998 | Naimark et al. | 434/307 |
| 5,850,463 | A * | 12/1998 | Horii | 382/118 |
| 5,861,906 | A | 1/1999 | Dunn et al. | 348/7 |
| 5,894,320 | A | 4/1999 | Vancelette | 348/7 |
| 6,065,042 | A | 5/2000 | Reimer et al. | 709/203 |
| 6,184,926 | B1 | 2/2001 | Khosravi et al. | 348/239 |
| 6,283,858 | B1 * | 9/2001 | Hayes et al. | 463/31 |
| 6,301,370 | B1 | 10/2001 | Steffens et al. | 382/103 |
| 6,345,293 | B1 | 2/2002 | Chaddha | 709/219 |
| 6,404,900 | B1 | 6/2002 | Qian et al. | 382/103 |
| 6,677,967 | B2 * | 1/2004 | Sawano et al. | 715/839 |
| 6,894,686 | B2 * | 5/2005 | Stamper et al. | 345/419 |
| 6,919,892 | B1 * | 7/2005 | Cheiky et al. | 345/473 |
| 2001/0056574 | A1 | 12/2001 | Richards | 725/36 |
| 2002/0007718 | A1 * | 1/2002 | Corset | 84/609 |
| 2002/0100042 | A1 | 7/2002 | Khoo et al. | 725/34 |
| 2002/0108114 | A1 | 8/2002 | Shinobara et al. | 725/46 |

(Continued)

OTHER PUBLICATIONS

Lee et al., IEEE, 2001, "CFBOX: Superimposing 3D human face on motion picture" (pp. 1-8).*

(Continued)

*Primary Examiner*—Manav Seth
(74) *Attorney, Agent, or Firm*—McDonnell Boehnen Hulbert & Berghoff LLP

(57) ABSTRACT

The present invention is a system and method for immersing facial images of people captured automatically from an image or a sequence of images into a live video playback sequence. This method allows viewers to perceive a participation in the viewed "movie" segment. A format is defined for storing the video such that this live playback of the video sequence is possible. A plurality of Computer Vision algorithms in the invention processes a plurality of input image sequences from the means for capturing images, which is pointed at the users in the vicinity of the system and performs the head detection and tracking. The interaction in the invention can be performed either in real-time or off-line depending on the embodiment of the invention in an uncontrolled background.

31 Claims, 10 Drawing Sheets

U.S. PATENT DOCUMENTS

2003/0007700 A1* 1/2003 Gutta et al. ............... 382/282
2003/0228135 A1* 12/2003 Illsley .......................... 386/52

OTHER PUBLICATIONS

U.S. Appl. No. 60/369,279, filed Apr. 2, 2002, Sharma.
U.S. Appl. No. 60/399,246, filed Jul. 29, 2002, Sharma.
U.S. Appl. No. 60/402,817, filed Aug. 12, 2002, Sharma.
U.S. Appl. No. 60/409,435, filed Sep. 10, 2002, Sharma.
U.S. Appl. No. 60/421,717, filed Oct. 28, 2002, Sharma.
N.Kranstoever, S.Kettebekov, M.Yeasin, & R. Sharma, "iMAP: A Real-Time Framework for Natural Multimodal Interaction with Large Screen Displays," Dept. of Comp. Science and Eng. Technical Report CSE-02-010, Pennsylvania State University, May 2002.
E.Osuna, R.Freund, & F.Girosi, "Training Support Vector Machines: An Application to Face Detection," Proc. IEEE Conf. Computer Vision and Pattern Recognition, pp. 130-136. 1997.
C.Ridder, O.Munkelt, & H.Kirchner. Adaptive Background Estimation and Foreground Detection using Kalman-Filtering. In Proceedings of International Conference on recent Advances in Mechatronics, ICRAM 95, UNESCO Chair on Mechatronics, 193-199, 1995.
H.Rowley, S.Baluja, & T.Kanade, "Neural Network-Based Face Detection," IEEE Trans. Pattern Analysis and Machine Intelligence, vol. 20, No. 1, pp. 23-38, Jan. 1998.
R.Sharma, V.I., Pavlovic', & T.S.Huang. "Toward Multimodal Human-Computer Interface" Proceedings of the IEEE (Special issue on Multimedia Computing and Communication) 86(5): 853-869, May 1998.
C.Stauffer & W.E.L. Grimson. Adaptive Background Mixture Models for Real-Time Tracking. In Computer Vision and Pattern Recognition, vol. 2. pp. 246-253, Jun. 1999.
M.H.Yang, D.J.Kriegman, & N.Ahuja, "Detecting Faces in Images: A Survey," IEEE Trans. Pattern Analysis and Machine Intelligence, vol. 24, No. 1, Jan. 2002.

* cited by examiner

METHOD AND SYSTEM FOR IMMERSING FACE IMAGES INTO A VIDEO SEQUENCE

CROSS-REFERENCE TO RELATED APPLICATIONS

This application is entitled to the benefit of Provisional Patent Application Ser. No. 60/437,566, filed Dec. 31, 2002.

FEDERALLY SPONSORED RESEARCH

Not Applicable

SEQUENCE LISTING OR PROGRAM

Not Applicable

BACKGROUND OF THE INVENTION

1. Field of the Invention

The present invention is a system and method for immersing facial images of people captured automatically from a sequence of images into a live video playback sequence. This method allows viewers to perceive a participation in the viewed "movie" segment. A format is defined for storing the video such that this live playback of the video sequence is possible.

2. Background of the Invention

There have been attempts for making a movie or video entertainment system to be personalized or interactive in the prior arts.

U.S. Pat. No. 5,861,906 of Dunn et al. disclosed an interactive entertainment system, which allowed viewers to create their own customized lists of preferred video content programs, such as movies or TV shows, thus providing a convenient way to manage lists of movies according to the preferences of each viewer. Their invention also allowed a viewer to easily identify movies of interest.

U.S. Pat. No. 5,894,320 of Vancelette disclosed an invention, in which a viewer could select among a choice of available camera angles and audio feeds when viewing a sporting event in a television without changing the channel. In his invention, the user could select alternative audio and video signals also. Thus the user was given the opportunity to customize the programming. However, the user was still left out of the content itself. The user remained as a viewer and no further participation of the user was allowed. For example, for the viewer to become a player in the sporting event by immersing the viewer's image into a player image was not possible in his invention.

U.S. Pat. No. 6,065,042 of Reimer et al. disclosed a method and apparatus for providing on demand access to information related to a movie while the movie is being presented to a user. The invention also discussed about a system and method for enabling a user to create, modify, and utilize a personalized version of a movie through the personalized presentation manager. In this personal movie version, the user could include shots not in the theatrical presentation or the VCR video version, and/or may exclude shots, takes, clips, and/or scenes that are in the theatrical presentation and/or the VCR video version. The user could also change the sequence and/or the length of shots, takes, clips, and/or scenes using the personalized edit decision list. However, the user was also left out of the content itself in this invention. The user remained as a viewer and no direct participation of the user was possible in this invention.

U.S. Pat. No. 6,345,293 of Chaddha disclosed a cost effective method for generating and delivering personalized multimedia content targeted at specific end users or groups of end users via client computers coupled to local servers by a diverse computer network. The personalized content was generated based on the personal profile, but the invention particularly related to the distribution of customized multimedia content over a network rather than to the creation itself of the customized content.

One example of active involvement of viewers to the content is the following disclosed invention. U.S. Pat. No. 4,569,026 of Best disclosed a method and apparatus for a video entertainment system by which viewers or users could conduct simulated voice conversations with screen actors or cartoon characters in a branching story game, which was shown on a television screen. In his invention, the actors and cartoon characters replied responsively with lip-sync sound to words spoken by the users. In order for the users to know what words they could use at each branch point, a menu of prompting words was displayed on a hand-held unit. With his invention, users could interact with the simulated images or contents, which respond to each user's words, on the screen. Although this invention attempted to change the flow of content through user interaction, using speech input modality, there was no graphical involvement from the user. The image of the user did not have anything to do with the content, thus leaving the users still out of the presented content and making the users only be standoff watchers.

Although there have been attempts for making movies or video entertainment media to be personalized or more interactive in the prior arts, the approaches are more concerned with the outward methodologies of doing so, in which the way to enjoy the system and/or movies was personalized rather than personalizing the content itself of the presented movies or video entertainment media. For example, customizing a list of movies or a bulletin of related movies, customizing the sequence or the length of the movie shots were attempted. Even when the content was to be personalized in a few attempts in the prior arts, the image of the user did not have anything to do with the content of the presented movie or video entertainment media, thus leaving the users out of the presented content and making the users only be standoff watchers. In other words, there still remains a need to personalize content of the movie or video entertainment media itself, especially the user's graphical involvement into the content as a participant is necessary. When the users see themselves in the movie, they can truly feel that they are participating in the movie.

The proposed invention is an attempt to make the content of the movie media to be personalized and interactive by immersing the users' body images into the content as participants and changing the content either automatically or manually through users' direct interaction. With the invention, the users can actively participate into the movie content. The invention also intelligently allows the replacement of the images be automatically personalized and matched depending on the demographic information about the users.

SUMMARY

The present invention is a system and method for immersing facial images of people captured automatically from a sequence of images into a live video playback sequence. In order to do this, the invention captures the users' face images and replaces the matching replaceable actors' images of a movie on a means for displaying content with the captured users' images. This method allows viewers to perceive a participation in the viewed "movie" segment. A format, called participative movie format (PMF), is defined for storing the video such that this live playback of the video sequence is possible.

One or a plurality of means for capturing images can be used as a means to sense the users' images, and a means for displaying content can display the movie, which is processed by the invention. In a particular embodiment, the invention consists of one or a plurality of means for capturing images, one or a plurality of means for displaying contents (movies), one or a plurality of means for processing and controlling, one or a plurality of means for playing sound, and one or a plurality of means for playing and recording movie media externally or internally. One or a plurality of means for controlling lights and one or a plurality of means for printing can be attached to the system as secondary means.

The invention can detect the face (head) of the user in an uncontrolled background. The invention can also allow multiple users interact with the content displayed through the means for displaying contents, using conventional interaction means, such as keyboard, mouse, control buttons on the system, remote controller, or touch-screen, which can be found in a conventional touch-screen system. The invention can also allow the multiple users in an uncontrolled background interact with the contents, using the contact-free interface. The contact-free interface can be implemented using any of the reliable real-time gesture recognition technology in the computer vision. One example of the contact-free interface is explained in detail by R. Sharma, N. Krahnstoever, and E. Schapira, "Method and System for Detecting Conscious Hand Movement Patterns and Computer-generated Visual Feedback for Facilitating Human-computer Interaction", U.S. Provisional Patent 60/369,279, Apr. 2, 2002.

At the initiation state, the invention can give brief instruction about using the system to the user through the means for displaying contents. In order for the invention to know which users' images are to replace the replaceable actors' images, the users have to show themselves to the system. This state may be called as the audition state. This audition state can be executed once in the beginning of creating a new movie, or it can be executed repeatedly while a movie is playing in real-time for the real-time replacement of the images, depending on the embodiments of the invention.

Once a user appears in the vicinity of the system, the user is detected by the face detection technology. For the face detection, any robust, reliable, and efficient face detection method can be used. In U.S. Pat. No. 6,184,926 of Khosravi et al. and U.S. Pat. No. 6,404,900 of Qian et al., the authors disclosed methods for human face detection. In M. H. Yang, D. J. Kriegman, and N. Ahuja, "Detecting Faces in Images: A Survey," IEEE Trans. Pattern Analysis and Machine Intelligence, vol. 24, no. 1, January 2002, the authors describe various approaches for the face detection. In the exemplary embodiment, a neural network based face detector or SVM based face detection method may be used. H. Rowley, S. Baluja, and T. Kanade, "Neural Network-Based Face Detection," IEEE Trans. Pattern Analysis and Machine Intelligence, vol. 20, no. 1, pp. 23-38, January 1998, explains about the neural network based face detector in more details. E. Osuna, R. Freund, and F. Girosi, "Training Support Vector Machines: An Application to Face Detection," Proc. IEEE Conf. Computer Vision and Pattern Recognition, pp. 130-136, 1997 explains about the SVM based face detection approach in more details.

After a face is detected, an independent face tracker can begin the tracking of the user's detected face. This face tracking process can be skipped if the embodiment needs to get the users' images only at the initial audition time. The face tracking can more likely be used for the real-time and dynamic embodiment of the invention, where the users' live images replace the replaceable actors' images in real-time.

Although the present invention primarily captures facial images of people from a sequence of images, the invention can also get the users' images from other sources than the person's direct appearance. For example, a user might want to include images of those, who may not be with the user at the moment, such as his or her friends, family members, or movie stars. In this case, the user can use alternative input media, such as scanned photograph images or image files from digital camera, to give the input images to the system.

After the face image is detected, the user can have a chance to look at the detected image and decide whether to accept the detected face image or not. Some people might want to change the detected face image until they get a satisfactory image. Once the user accepts the face image, the image is sent to the demographic classification module and to the user image and attribute database to be stored.

The replacement of the images can be automatically personalized and matched depending on the demographic information about the user. For example, if the user is a female adult, the replaceable actor images can be oriented to the matching actors' images with the corresponding demographic group. The demographic classification module of the invention uses the detected face image from the user to classify the demographic information about the user. An application of the demographic classification is explained in detail by R. Sharma and A. Castellano, "Method for augmenting transaction data with visually extracted demographics of people using computer vision", U.S. Provisional Patent, 60/402,817, Aug. 12, 2002, and by R. Sharma and T. Castellano, "Automatic detection and aggregation of demographics and behavior of people using computer vision", U.S. Provisional Patent, 60/399,246, Jul. 29, 2002. One example of demographic classification for age is described in detail by R. Sharma, R. Khare, and M. Yeasin, "Methodology and system for automatic age category classification", U.S. Provisional Patent, 60/421,717, Oct. 28, 2002.

The invention gathers the demographic information about the users, which can be gathered by computer vision technology, such as gender, age, or ethnicity of the users, without requesting input from the users. This demographic information could become part of the attributes of the users (users' images). The image and the attributes, such as the demographic information about the users, are stored in the user image and attribute database in a memory space of the embodiment, and a unique ID is generated for each of the new data entry. If any of the users' record already exists in the database, the corresponding data entry can be updated by the new data. The ID can be reused, when a data record is deleted from the database.

In the invention, the digital or non-digital movie and its media, which are equipped with the format information and the capability for immersing facial images of people captured automatically from a sequence of images into a live video playback sequence, can be called as participative movie and participative movie media. The participative movie media, such as the PMF optical videodisc, the PMF videotape, or the PMF movie file, will have information about the replaceable actor images and their properties in the invention. The information about the replaceable actor images and their properties can be stored in the participative movie format. When a user loads the participative movie from the participative movie media, purchased or rented, the information about the replaceable actor images and their properties are loaded to the PMF system. The PMF system is an external/internal movie play and record system, connected to the means for processing and controlling, which supports the participative movie format in a PMF media, such as the PMF optical videodisc, the PMF videotape, or the PMF movie file along with the conventionally known movie formats in conventionally known media, such as the DVD disc, the VHS videotape, the MPEG movie file, or any standard movie media.

The user can also use pre-stored images and attributes information stored in the pre-stored image and attribute database. This is useful when the user does not do the audition, but wants to see the participative movie, or the user does not have time to do the audition. This is also useful when the user already has images and attributes in the database, which he or she particularly likes and had already stored in the past, such as images and attributes of friends, family members, or movie stars. The user also might want to use his or her younger-self, which he or she had stored many years ago, along with the person's current image. Using this feature, the user is also able to replace an actor, whom the user does not like, with another movie star, whom the user likes.

The pre-stored images and attributes can be shown to the user through the means for displaying contents and the final images and attributes can be decided by the user input using said interfaces.

The properties are compared with the attributes of the users' images and attributes, which are classified by the demographic classification module, and the best matching replaceable actor images are matched with the corresponding users' images. One way to match these two images can be matching the actor IDs in the actor ID lookup table from the loaded replaceable actor image and property database and the user IDs from the user ID generation module. The participative movie media will let the users know the maximum number of available replaceable actors' images and properties per the participative movie. Therefore, if there are more users' images, they can be discarded. On the contrary, if there are more replaceable actors' images and properties, then default actor images can be played and no image replacement will happen for these extra replaceable actors' image and properties. The content creator of particular embodiment of the invention can decide the field of each database record.

If the user does not want to use the automatic matching, the person can manually select the replaceable actors' images displayed on the selection menu for the available replaceable actors' images through said interaction interfaces.

In one embodiment of the invention, once the replaceable actors' images and the replacing users' images are decided and matched, a new movie can be created by the system, which could be called as the user-participated movie, through the user image immersion to the participative movie and its media. After the user-participated movie is created, the users can watch and enjoy the movie in this embodiment.

However, in another embodiment, the invention matches the images and immerses the users' images into the replaceable actors' images and plays the movie in real-time. The creation of the movie can be done optionally in the background process, while the movie is playing, as long as the processor is able to support the feature in this real-time immersion mode. The creation of the movie can also be done optionally after the movie play completes by storing the scenes in a temporary storage space, as long as the embodiment of the invention has enough storage space in this real-time immersion mode. In this real-time matching and immersion embodiment, the invention tracks the users and gets new images for them. The User IDs are generated newly through the User ID generation module in a predefined interval. Once a user ID for a user image and attribute is generated, the invention can go back to the initial state or audition state in order to process next user by restarting the face detection for a new user.

Regardless of the differences between the approaches of the embodiments, the newly created user-participated movie can have any standard movie format, such as VHS video format or DVD disc format. Thus, it can be played with any conventional movie player, which supports the standard movie format. The embodiment of the invention can also print the screen shots of the immersed video images, if the user chooses to do so.

If the participative movie also supports dynamic content adjustment, the user can also change the storyline of the participative movie by selecting the storyline what he or she wants, within the available content selection options, provided by the participative movie. The ending style of the movie, either happy ending or sad ending, background of particular movie scenes, type of the automobile the main actor rides in the movie, color of actors' hair, sound-track music, special sound effects, or any movie contents, which can be varied, can be examples of the adjustable movie content in the participative movie. This feature virtually enables the user become a movie director and create a new movie of his or her own, by varying the movie contents and compositing them in the final user-participated movie creation. In order to support this feature the participative movie could have bigger size than the conventional one single storyline movie. The content creator for the participative movie will decide how many different storylines or personalize-able content options to give to each participative movie. Thus, the content creator for the participative movie can provide the seamless flow of playing the newly created user-participated movie.

However, in the real-time creation and running embodiment, the content customization will be accomplished in cooperation with the system's runtime situation. For example, the newly changed content cannot be shown right away, but it will be shown in the next chapter of the movie. If the current content from the current chapter of the user-participated movie cannot be seamlessly connected to the newly customized content for the next chapter of the user-participated movie, the new customization could be discarded.

The replaceable actors' images in the participative movie are replaced by the users' images in the list of users' images and attributes in the database through the actor and user matching process. The screen shots without the replaceable actors' images are left as they are, unless they are designed to be controllable and customizable contents.

In the invention, there are two different groups of graphical objects, such as static graphical objects and dynamic graphical objects. Static graphical objects are the graphical objects, which do not change whatsoever. Dynamic graphical objects are defined to be the graphical objects, which can be influenced by the user's interaction, and it is further divided into two groups, such as replaceable graphical objects and controllable graphical objects. The replaceable graphical objects are defined to be the graphical objects, which can be replaced by the user's image, such as the replaceable actors' images. The controllable graphical objects are the graphical objects, which can be controlled by the user's body motion. These images can interactively change the position or shape, on the means for displaying content, while the user moves.

The content creator decides which graphical objects can be dynamic and which graphical objects can be static. The information about these dynamic and static graphical objects is stored in the participative video, and it is loaded at the initial running of the system. The controlling and processing system in the invention dynamically changes the composite of the images in the runtime, responding to the user's interaction.

DRAWINGS

Figures

DETAILED DESCRIPTION OF THE INVENTION

Figure 1:
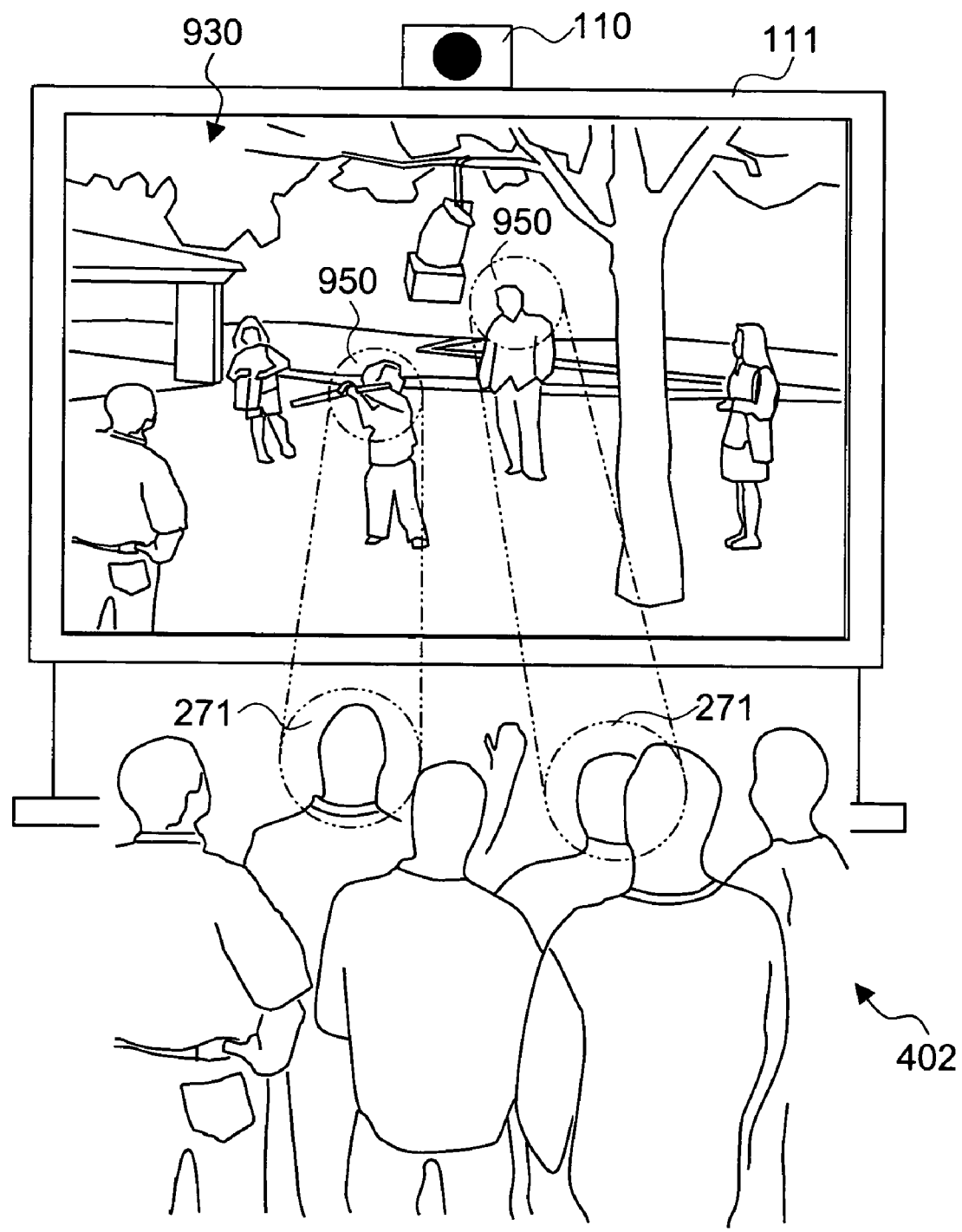
FIG. 1 is an overall view of one of the preferred embodiments of the invention.

FIG. 1 is an overall view of one of the preferred embodiments of the invention. In this particular exemplary embodiment shown in FIG. 1, the invention captures the users' facial images 271 and replaces the matching replaceable actor image and property 950 of a movie 930 on a means for displaying contents 111 with the captured user's images. The format, in which the process of replacing the replaceable actor images and properties 950 in the video sequence with the users' facial images 271 is possible, can be called participative movie format (PMF) in the invention. The details of the PMF are explained in the later descriptions. One or a plurality of means for capturing images 110 can be used as a means to sense the users' images, and a means for displaying contents 111 can display the movie 930, which is processed by the invention. The invention can detect the facial images (head) 271 of the users in an uncontrolled background. Efficient implementation allows the tracking 301 of the detected face and replacement of the images possible in real-time.

As in the exemplary embodiment shown in FIG. 1, the invention can also allow multiple users 402 interact with the content displayed through the means for displaying contents 111, using conventional interaction means, such as keyboard, mouse, control buttons on the system, remote controller, or touch-screen, which can be found in a conventional touch-screen system. The invention can also allow the multiple users 402 in an uncontrolled background interact with the contents, using the contact-free interface. The contact-free interface can be implemented using any of the reliable real-time gesture recognition technology in the computer vision. One example of the contact-free interface is explained in detail by R. Sharma, N. Krahnstoever, and E. Schapira, "Method and System for Detecting Conscious Hand Movement Patterns and Computer-generated Visual Feedback for Facilitating Human-computer Interaction", U.S. Provisional Patent 60/369,279, Apr. 2, 2002.

Figure 2:
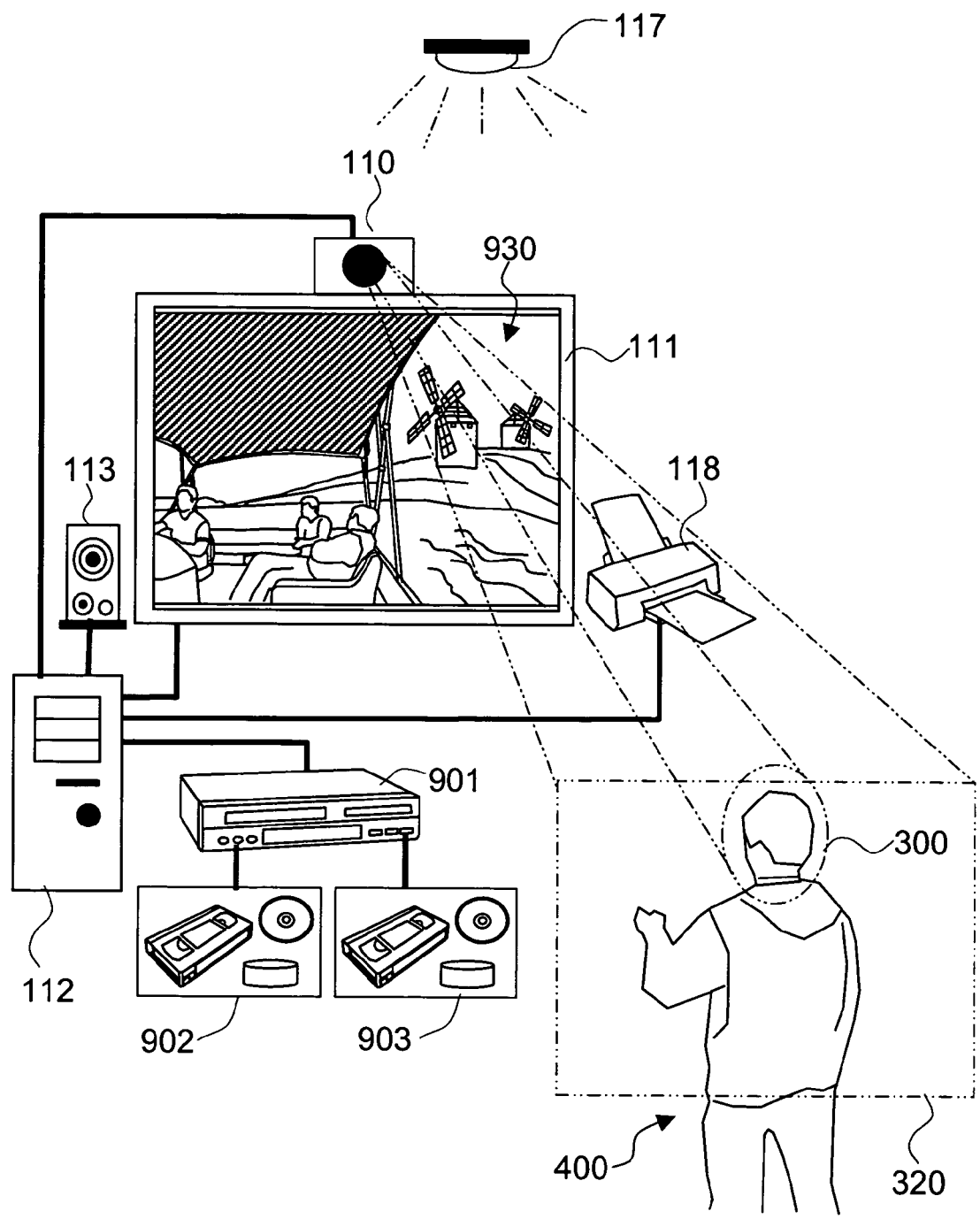
FIG. 2 is an overall view of the preferred system components for the invention.

FIG. 2 is an overall view of the preferred system components for the invention. In this particular exemplary embodiment shown in FIG. 2, the invention consists of one or a plurality of means for capturing images 110, one or a plurality of means for displaying contents (movies) 111, one or a plurality of means for processing and controlling 112, one or a plurality of means for playing sound 113, and one or a plurality of means for playing and recording PMF movie media 901 externally or internally. The means for playing and recording PMF movie media 901 can be called as the PMF system, which is an external/internal movie play and record system, connected to the means for processing and controlling 112, and supports the participative movie format 951 in a PMF media 902, such as the PMF optical videodisc, the PMF videotape, or the PMF movie file along with the conventionally known movie formats in conventionally known media 903, such as the DVD disc, the VHS videotape, the MPEG movie file, or any standard movie media. One or a plurality of means for controlling lights 117 and one or a plurality of means for printing 118 can be attached to the system as secondary means.

The means for processing and controlling 112 is connected to the sub-means, such as the means for capturing images 110, the means for displaying contents (movies) 111, the means for playing sound 113, the means for playing and recording PMF movie media 901 externally or internally, the means for controlling lights 117, and the means for printing 118, as in the exemplary embodiment shown in FIG. 2. The means for processing and controlling 112 is hidden in the exemplary embodiment shown in FIG. 1, and it can be installed in any place locally or remotely, as long as it can be connected to the relevant sub-means conveniently, securely, and efficiently. A computer system, such as the Dell Precision 530, with processors, such as the dual Pentium Xeon 1700 Mhz microprocessors, and with memory, such as the Samsung 786 MB DRAM, may be used as the means for processing and controlling 112 in the exemplary embodiment. The means for processing and controlling 112 may process the interaction between the invention and the user 400, in case user input is sent to the invention.

The means for capturing images 110 includes a system with one or a plurality of image-capturing devices, such as cameras, frame grabbers and all relevant conventional imaging peripherals, in the invention. The means for capturing images 110 can be either dynamic or static. The definition of the dynamic means for capturing images is that the means for capturing images should have capability to dynamically adjust all the conventional means for capturing images functionality, such as pan, tilt, zoom, focus, auto-exposure, and white balance, and one or a plurality of the applications in the invention should be able to control the means for capturing images with these capabilities according to the specific application needs.

The definition of the static means for capturing images is that the means for capturing images does not have capability of the dynamic adjustment of the field of view 320, such as changing the pan and tilt. The static means for capturing images is useful for the applications, in which the constant field of view images are sufficient enough to meet the purpose of the specific applications. The static means for capturing images can usually provide a low cost solution to business.

In the exemplary embodiment shown in FIG. 2, a camera, such as the Sony EVI-D30, and frame grabber, such as the Matrox Meteor II frame grabber, may be used as said means for capturing images 110 if dynamic control is needed. A firewire camera, such as the Pyro 1394 web cam by ADS technologies or iBOT FireWire Desktop Video Camera by OrangeMicro, or a USB camera, such as the QuickCam Pro 3000 by Logitech, may be used as the means for capturing images 110 if dynamic control of the field of view is not needed and the static input images are sufficient enough to process the user detection in the invention. A plurality of such means for capturing images 110 can be used for multiple processing for multiple users 402 in the exemplary embodiment shown in FIG. 2.

The means for displaying contents (movies) 111 in the invention can be used to play movies, which are processed by the invention. The means for displaying contents (movies) 111 can be any kind of conventionally known displaying device, such as movie theater screen, computer monitor, or home TV set. Within this sense, the means for displaying contents (movies) 111 can be any non-portable or portable display device, such as LCD screen of palm pilot or cellular phone, as long as the device can support playing a movie. A large display screen, such as the Sony LCD projection data monitor model number KL-X92000, may be used as the means for displaying contents (movies) 111 in the exemplary embodiments.

The means for playing sound 113 can be used for playing the audio content of the movie. The means for playing sound 113 can be used for giving the instructions to the user 400 and giving the audio feedback during the interaction by the user 400. The means for playing sound 113 can be any kind of conventionally known appropriate audio device in the invention. In the exemplary embodiment, the Harman/Kardon multimedia speaker system may be used as the means for playing sound 113. Built-in sound system in the means for displaying contents (movies) 111 can be used as the means for playing sound 113. The invention can place the means for playing sound 113 inside a housing or anywhere in the system installation area, from which the user 400 can hear the sound well.

The means for controlling lights 117, as shown in FIG. 2, helps the invention to process the user detection by helping computer vision technology operate more reliably. The means for controlling lights 117 is not the essential part of the invention, but they belong to the invention as an environmental set up, in a broader concept. The balance between the optimal lighting situation for Computer Vision technology and the optimal lighting situation for simulating comfortable movie watching environment can be controlled by the means for controlling lights 117. The means for controlling lights 117 can use any conventional lighting devices, and it is preferable to use diffused lighting. The lighting can be mounted so that it does not direct light into the user's eyes yet illuminate the face of the user 400. The means for controlling lights 117 can be mounted on the front of a housing unit, overhead of the housing unit using lighting tubes, or on the ceiling in the installation area. The means for printing 118 can be used to print the screen shots of the immersed video images.

The processing software and application may be written in a high-level computer programming language, such as C++, and a compiler, such as Microsoft Visual C++, may be used for the compilation in the exemplary embodiment. Image creation and modification software, such as Adobe Photoshop, may be used for creating digital contents, such as instructions to the user, in the exemplary embodiment.

Figure 3:
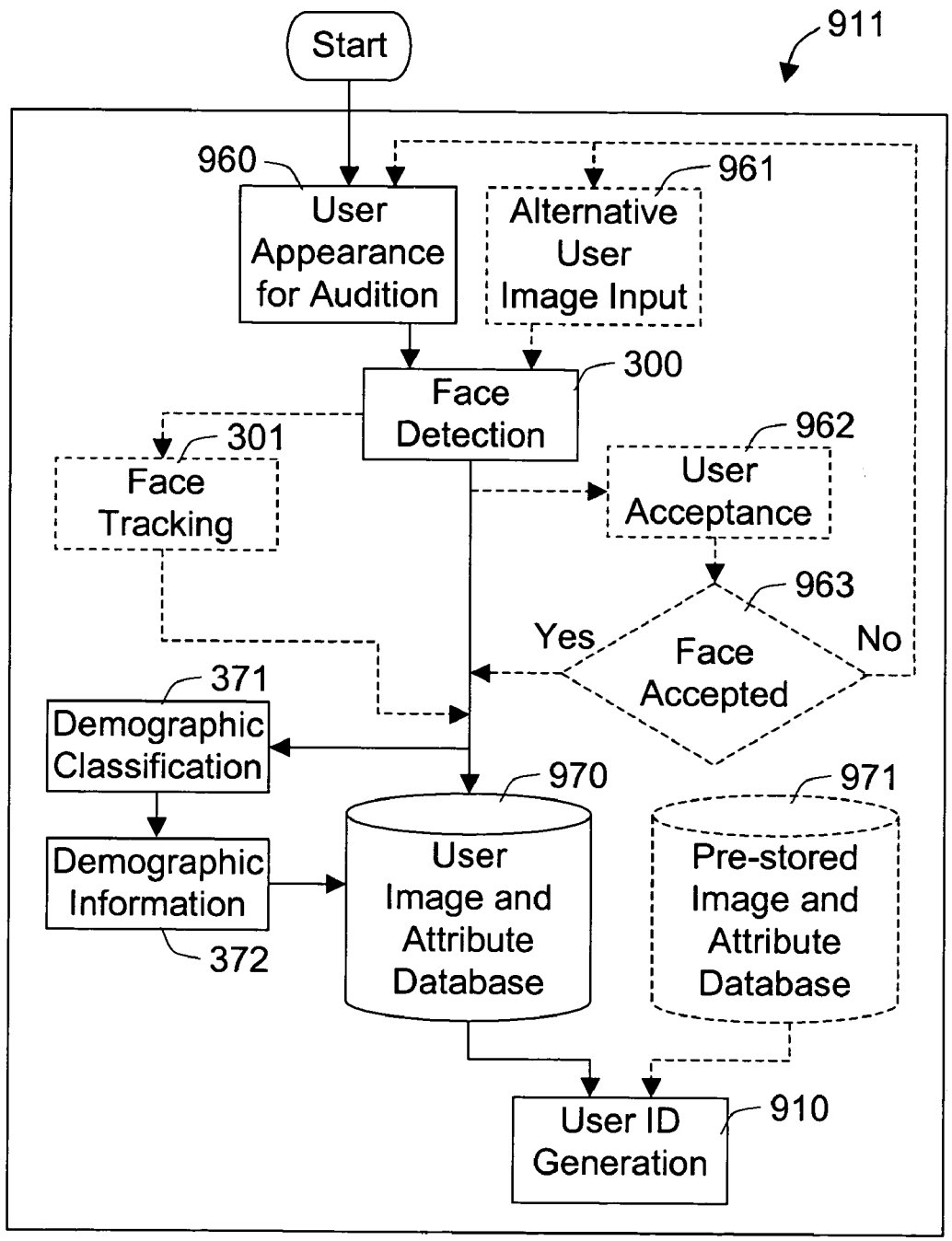
FIG. 3 is a state diagram of processes for the User ID Generation Module of the invention.
Figure 6:
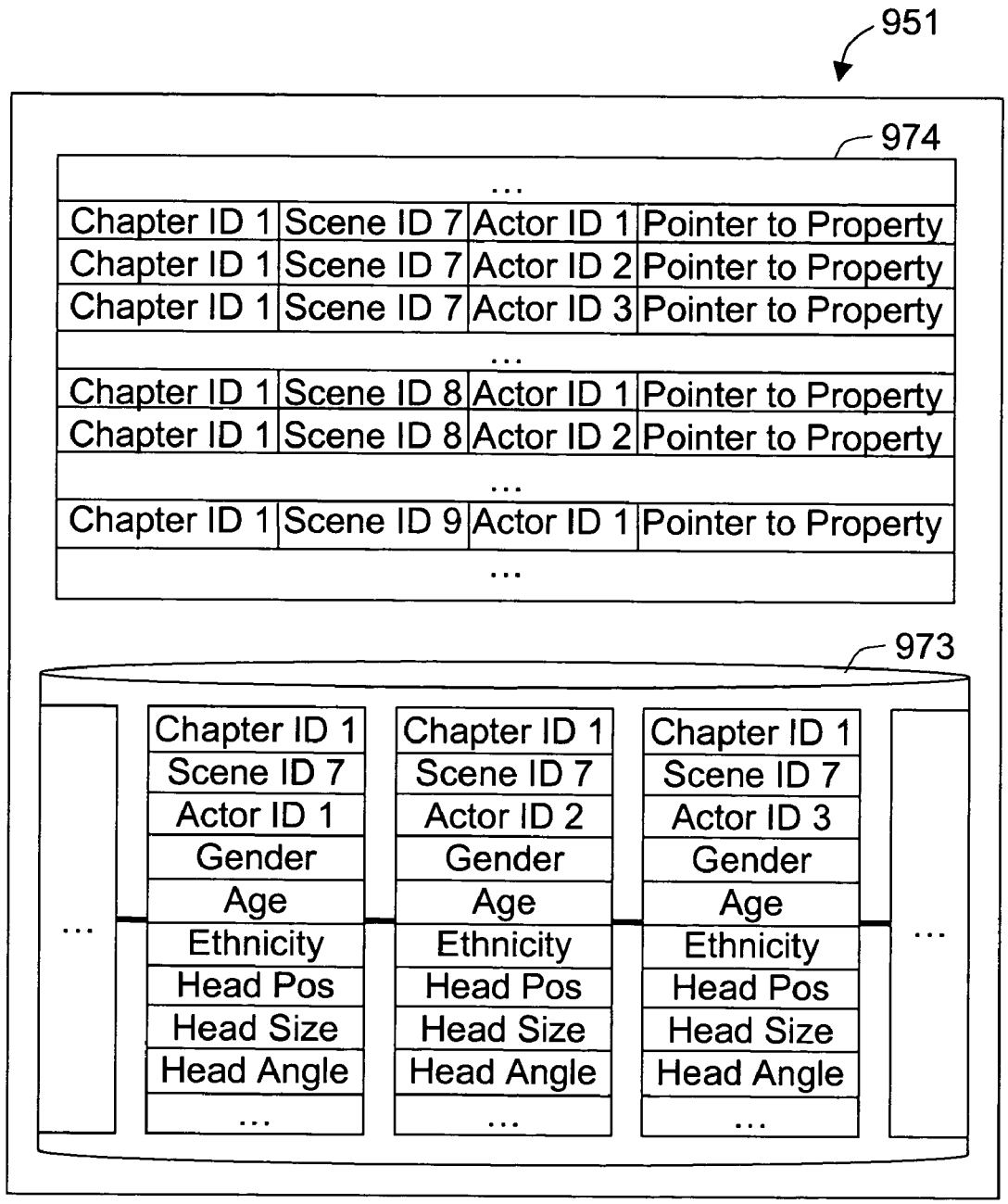
FIG. 6 shows an exemplary embodiment of the Replaceable Actor Image and Property database and Actor ID Lookup table of the invention.
Figure 7:
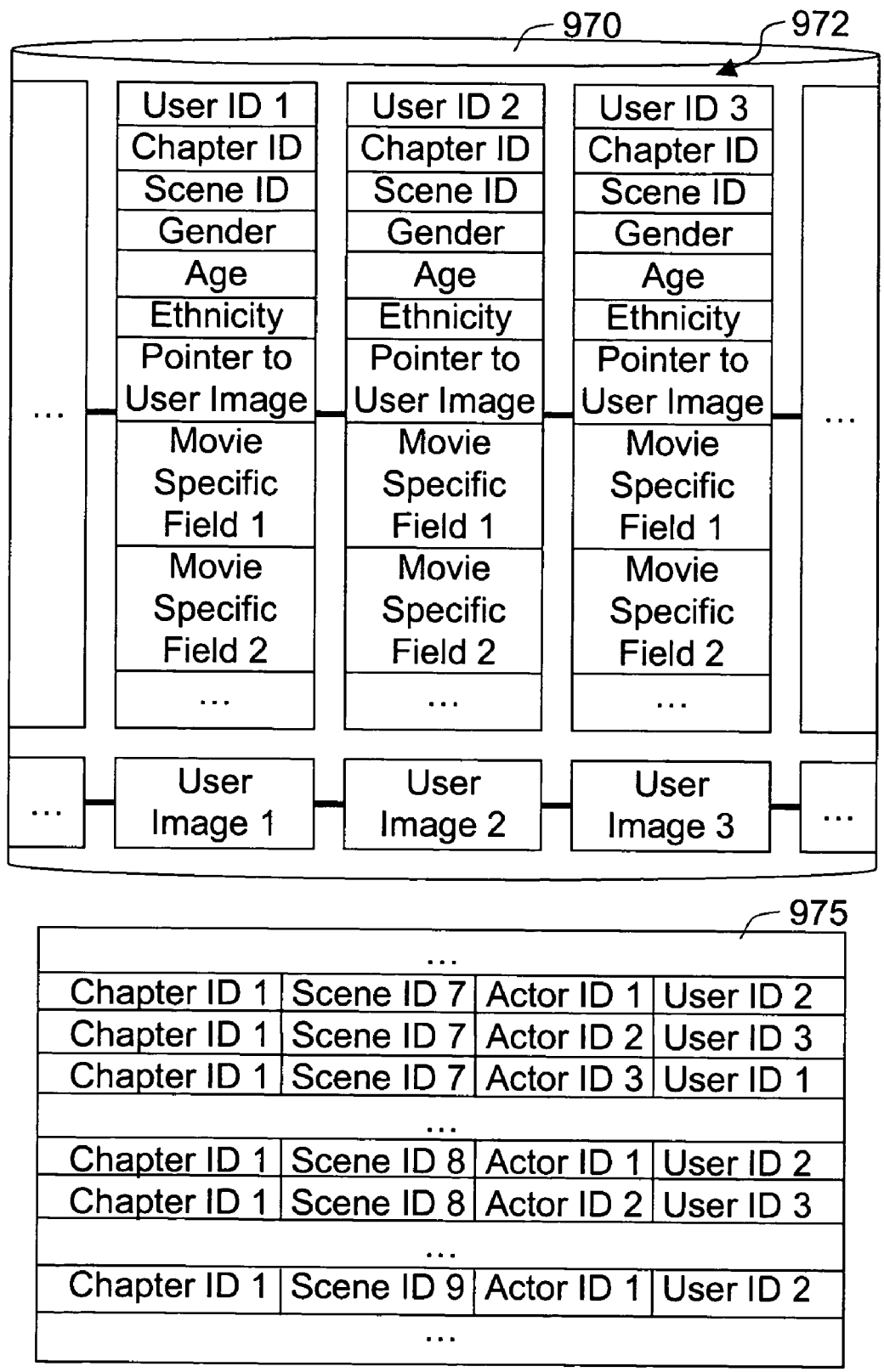
FIG. 7 shows an exemplary embodiment of the User Image and Attribute database and Actor and User Matching list of the invention.

FIG. 3 is a state diagram of processes for the User ID Generation Module of the invention. FIG. 6 shows an exemplary embodiment of the Replaceable Actor Image and Property database and Actor ID Lookup table of the invention. FIG. 7 shows an exemplary embodiment of the User Image and Attribute database 970 and Actor and User Matching list 975 of the invention.

At the initiation state, the invention can give brief instruction about using the system to the user through the means for displaying contents 111. In order for the invention to know which users' images are to replace the replaceable actors' images, the users have to show themselves to the system. This state may be called as the audition state. This audition state can be executed once in the beginning of creating a new movie, or it can be executed repeatedly while a movie is playing in real-time for the real-time replacement of the images, depending on the embodiments of the invention.

Once a user appears 960 in the vicinity of the system, the user is detected by the face detection 300 technology. For the face detection 300, any robust, reliable, and efficient face detection method can be used. In U.S. Pat. No. 6,184,926 of Khosravi et al. and U.S. Pat. No. 6,404,900 of Qian et al., the authors disclosed methods for human face detection. In M. H. Yang, D. J. Kriegman, and N. Ahuja, "Detecting Faces in Images: A Survey," IEEE Trans. Pattern Analysis and Machine Intelligence, vol. 24, no. 1, January 2002, the authors describe various approaches for the face detection. In the exemplary embodiment, a neural network based face detector or SVM based face detection method may be used. H. Rowley, S. Baluja, and T. Kanade, "Neural Network-Based Face Detection," IEEE Trans. Pattern Analysis and Machine Intelligence, vol. 20, no. 1, pp. 23-38, January 1998, explains about the neural network based face detector in more details. E. Osuna, R. Freund, and F. Girosi, "Training Support Vector Machines: An Application to Face Detection," Proc. IEEE Conf. Computer Vision and Pattern Recognition, pp. 130-136, 1997 explains about the SVM based face detection approach in more details.

After a face is detected 300 within the entire input frame of the input images to the means for capturing images 110, an independent face tracker begins the tracking 301 of the user's detected face, as in the exemplary embodiment shown in FIG. 3. In order to make the invention work in real time, efficient use of tracking 301 may be used in cooperation with the face detection 300, so that the face-tracking 301 step, which generally uses much less processing time, takes over the face image processing task right after the initial face is detected 300. This enables the system to do the entire region face detection 300 only at the beginning of the user interaction. After the initial global face detection 300, face-tracking 301 process provides the information about the user's face (head) image position and size. This face tracking 301 process can be skipped if the embodiment needs to get the users' images only at the initial audition time. The face tracking 301 can more likely be used for the real-time and dynamic embodiment of the invention, where the users' live images replace the replaceable actors' images in real-time.

In the exemplary embodiment shown in FIG. 3, the tracking method can be any reasonably reliable and efficient face tracking method, such as the skin-color based method, Viterbi-algorithm based method, or any real-time face-tracking algorithm. The algorithms for head tracking may be based on a rectangular tracking window whose location is continuously adapted using Kalman filters to follow the user's head. The head tracker can rely on skin color image cues, as explained in detail by N. Krahnstoever, S. Kettebekov, M. Yeasin, and R. Sharma, "iMap: A Real-Time Framework for Natural Multimodal Interaction with Large Screen Displays," Dept. of Comp. Science and Eng. Technical Report CSE-02-010, Pennsylvania State University, May 2002, and optimized to track skin colored moving objects. The tracking methods used are based on simple imaging cues but an extremely efficient and require less than 15% processing time of a single CPU.

Although the present invention primarily captures facial images of people from a sequence of images, the invention can also get the users' images from other sources than the person's direct appearance 960 as an alternative user image input 961. For example, a user might want to include images of those, who may not be with the user at the moment, such as his or her friends, family members, or movie stars. In this case, the user can use alternative input media, such as scanned photograph images or image files from digital camera, to give the input images to the system.

After the face is detected 300, the user can have a chance to look at the detected image and decide whether to accept the detected face image or not 962. Some people might want to change the detected face image until they get a satisfactory image. Once the user accepts the face image 963, the image is sent to the demographic classification 371 module and to the user image and attribute database 970 to be stored.

The replacement of the images can be automatically personalized and matched 914 depending on the demographic information 372 about the user. For example, if the user is a female adult, the replaceable actor images 950 can be oriented to the matching actors' images with the corresponding demographic group. The demographic classification 371 module of the invention uses the detected face image from the user to classify the demographic information 372 about the user. An application of the demographic classification is explained in detail by R. Sharma and A. Castellano, "Method for augmenting transaction data with visually extracted demographics of people using computer vision", U.S. Provisional Patent, 60/402,817, Aug. 12, 2002, and by R. Sharma and T. Castellano, "Automatic detection and aggregation of demographics and behavior of people using computer vision", U.S. Provisional Patent, 60/399,246, Jul. 29, 2002. One example of demographic classification for age is described in detail by R. Sharma, R. Khare, and M. Yeasin, "Methodology and system for automatic age category classification", U.S. Provisional Patent, 60/421,717, Oct. 28, 2002.

The invention gathers the demographic information 372 about the users, which can be gathered by computer vision technology, such as gender, age, or ethnicity of the users, without requesting input from the users. This demographic information 372 could become part of the attributes of the users (users' images). The image and the attributes, such as the demographic information 372 about the users, are stored in the user image and attribute database 970 in a memory space of the embodiment, and a unique ID is generated 910 for each of the new data entry. If any of the users' record already exists in the database, the corresponding data entry can be updated by the new data. The ID can be reused, when a data record is deleted from the database.

In the invention, the digital or non-digital movie and its media, which are equipped with the format information and the capability for immersing facial images of people captured automatically from a sequence of images into a live video playback sequence, can be called as participative movie and participative movie media. The participative movie media, such as the PMF optical videodisc, the PMF videotape, or the PMF movie file, will have information about the replaceable actor images and their properties 950 in the invention. The properties are compared with the attributes of the users' images and attributes 972, which are classified by the demographic classification 371 module, and the best matching replaceable actor images and properties 950 are matched 914 with the corresponding users' images.

The user can also use pre-stored images and attributes information stored in the pre-stored image and attribute database 971. This is useful when the user does not do the audition, but wants to see the participative movie, or the user does not have time to do the audition. This is also useful when the user already has images and attributes in the database, which he or she particularly likes and had already stored in the past, such as images and attributes of friends, family members, or movie stars. The user also might want to use his or her younger-self, which he or she had stored many years ago, along with the person's current image. Using this feature, the user is also able to replace an actor, whom the user does not like, with another movie star, whom the user likes.

The pre-stored images and attributes can be shown to the user through the means for displaying contents 111 and the final images and attributes, which will replace the replaceable actors' images, can be decided by the user input using said interfaces.

Once a user ID for a user image and attribute is generated 910, the invention can go back to the initial state or audition state in order to process next user by restarting the face detection 300 for a new user.

Figure 4:
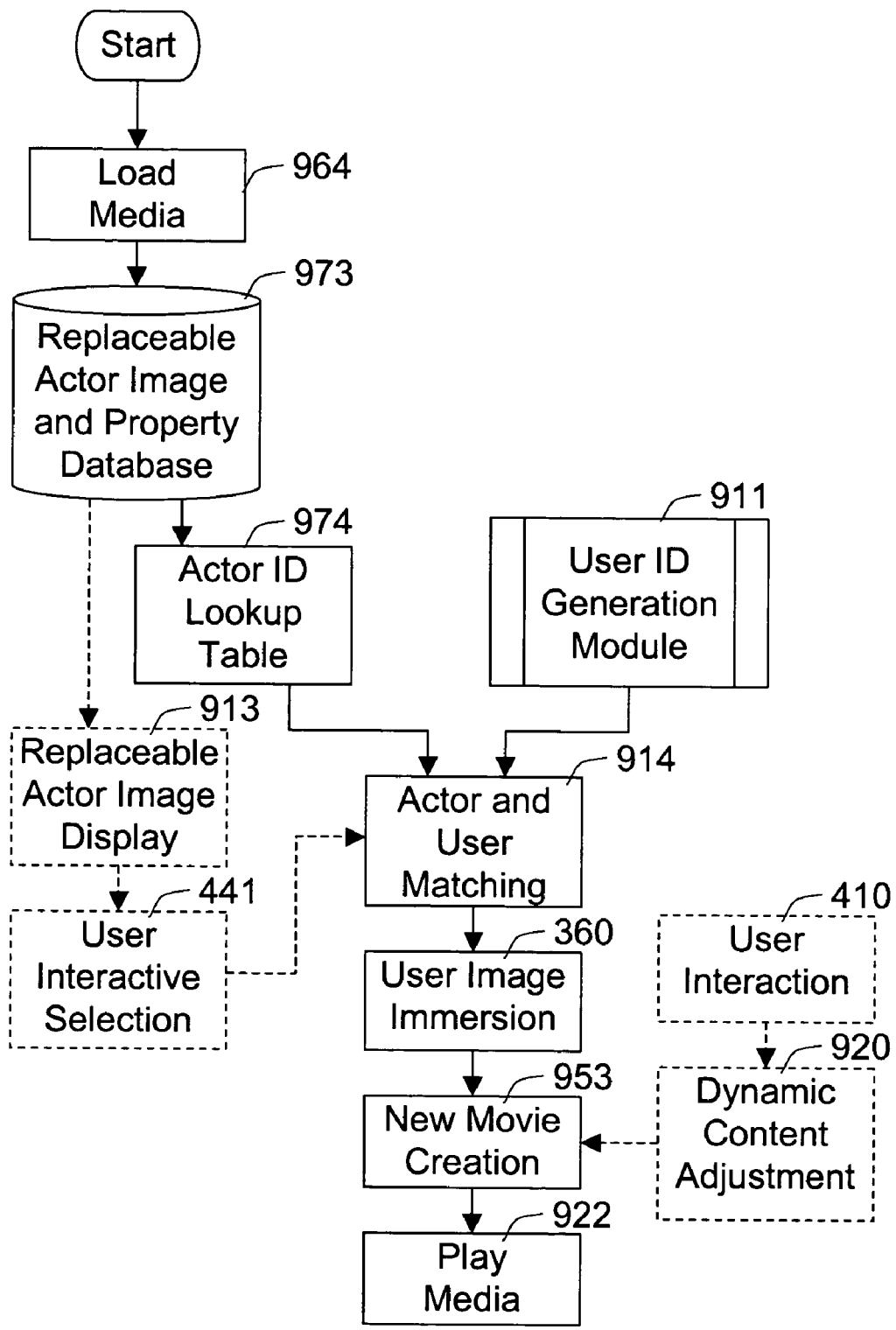
FIG. 4 is a state diagram of processes for one of the preferred embodiments of the invention.

FIG. 4 is a state diagram of processes for one of the preferred embodiments of the invention. FIG. 6 shows an exemplary embodiment of the Replaceable Actor Image and Property database and Actor ID Lookup table of the invention. FIG. 7 shows an exemplary embodiment of the User Image and Attribute database 970 and Actor and User Matching list 975 of the invention.

The participative movie in the participative movie media, such as the PMF optical videodisc, the PMF videotape, or the PMF movie file, will have information about the replaceable actor images and their properties 950 in the invention. The information about the replaceable actor images and their properties 950 can be stored in the participative movie format 951 as shown in the exemplary embodiment in FIG. 6. In the exemplary embodiment, the replaceable actor ID table 974 can contain information about the chapter ID, scene ID, actor ID, and pointers to the corresponding replaceable actor, images and properties. The replaceable actor image and property database 973 contains a structured list of each replaceable actor image and properties according to the chapter ID and scene ID of the movie. The properties of each record can contain chapter ID, scene ID, actor ID, demographic information 372 (gender, age, and ethnicity), immersive region of the actor image (head position, head size, and head angle), and any necessary information about the replaceable actor image and properties. The movie creators for particular embodiment of the participative movie can decide and create these properties.

If a user loads 964 the participative movie from the participative movie media, purchased or rented, the information about the replaceable actor images and their properties 950 are loaded to the PMF system. The PMF system is an external/internal movie play and record system, connected to the means for processing and controlling 112, which supports the participative movie format 951 in a PMF media 902, such as the PMF optical videodisc, the PMF videotape, or the PMF movie file along with the conventionally known movie formats in conventionally known media 903, such as the DVD disc, the VHS videotape, the MPEG movie file, or any standard movie media.

The properties are compared with the attributes of the users' images and attributes 972, stored in the user image and attribute database 970, which are classified by the demographic classification 371 module, and the best matching replaceable actor images are matched 914 with the corresponding users' images. One way to match these two images can be matching the actor IDs in the actor ID lookup table 974 from the loaded replaceable actor image and property database 973 and the user IDs from the User ID generation module 911. The participative movie media will let the users know the maximum number of available replaceable actors' images and properties per the participative movie. Therefore, if there are more users' images, they can be discarded. On the contrary, if there are more replaceable actors' images and properties, then default actor images can be played and no image replacement will happen for these extra replaceable actors' image and properties.

The content creator of particular embodiment of the invention can decide the field of each database record. For example, the records in the exemplary embodiment of the Replaceable actor image and property database 973, the Actor ID lookup table 974, the User image and attribute database 970, and Actor and User Matching list 975 as shown in FIG. 6 and FIG. 7 can have different type and number of fields. By changing the number of fields in the records, the embodiment can dynamically customize and extend the capability of the media and system.

If the user does not want to use the automatic matching, the person can manually select the replaceable actors' images displayed 913 on the selection menu for the available replaceable actors' images through the user interactive selection 441 method with the interaction interfaces.

Once the replaceable actors' images and the replacing users' images are decided and matched 914, a new movie can be created 953 by the system, which could be called as the user-participated movie, through the user image immersion 360 to the participative movie and its media. The newly created user-participated movie can have any standard movie format, such as VHS video format or DVD disc format. Thus, it can be played 922 with any conventional movie player, which supports the standard movie format. After the user-participated movie is created 953, the users can watch and enjoy the movie in this embodiment. The embodiment of the invention can also print the screen shots of the immersed video images, if the user chooses to do so.

If the participative movie also supports dynamic content adjustment 920, the user can also change the storyline of the participative movie by selecting the storyline what he or she wants through a user interaction 410, within the available content selection options, provided by the participative movie. The ending style of the movie, either happy ending or sad ending, background of particular movie scenes, type of the automobile the main actor rides in the movie, color of actors' hair, sound-track music, special sound effects, or any movie contents, which can be varied, can be examples of the adjustable movie content in the participative movie. This feature virtually enables the user become a movie director and create a new movie of his or her own, by varying the movie contents and compositing them in the final user-participated movie creation. In order to support this feature the participative movie could have bigger size than the conventional one single storyline movie. The content creator for the participative movie will decide how many different storylines or personalize-able content options to give to each participative movie. Thus, the content creator for the participative movie can provide the seamless flow of playing 922 the newly created user-participated movie.

Figure 5:
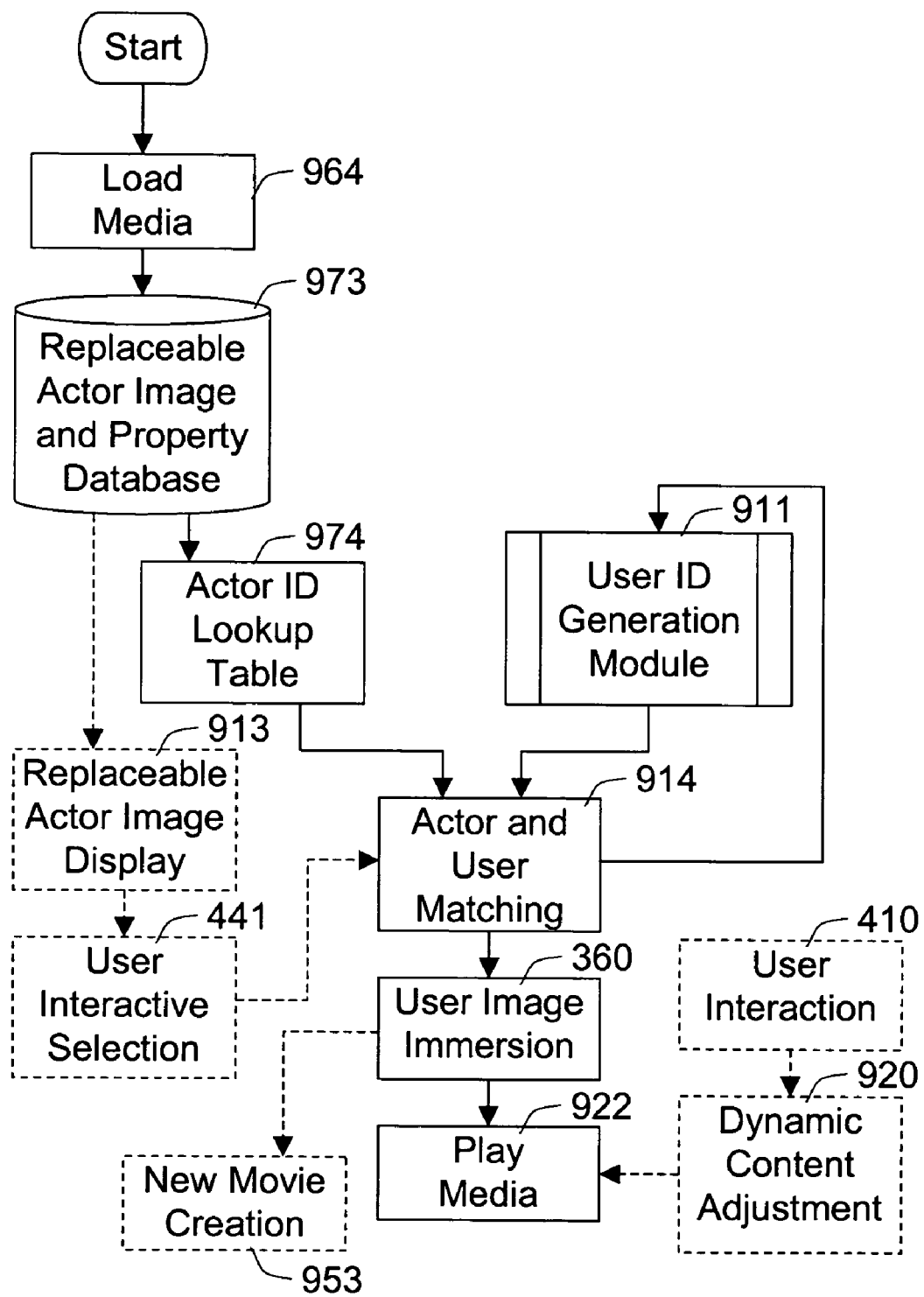
FIG. 5 is a state diagram of processes for another preferred embodiment of the invention.

FIG. 5 is a state diagram of processes for another preferred embodiment of the invention. FIG. 6 shows an exemplary embodiment of the Replaceable Actor Image and Property database and Actor ID Lookup table of the invention. FIG. 7 shows an exemplary embodiment of the User Image and Attribute database 970 and Actor and User Matching list 975 of the invention.

The participative movie in the participative movie media, such as the PMF optical videodisc, the PMF videotape, or the PMF movie file, will have information about the replaceable actor images and their properties 950 in the invention. The information about the replaceable actor images and their properties 950 can be stored in the participative movie format 951 as shown in the exemplary embodiment in FIG. 6. In the exemplary embodiment, the replaceable actor ID table 974 can contain information about the chapter ID, scene ID, actor ID, and pointers to the corresponding replaceable actor images and properties. The replaceable actor image and property database 973 contains a structured list of each replaceable actor image and properties according to the chapter ID and scene ID of the movie. The properties of each record can contain chapter ID, scene ID, actor ID, demographic information 372 (gender, age, and ethnicity), immersive region of the actor image (head position, head size, and head angle), and any necessary information about the replaceable actor image and properties. The movie creators for particular embodiment of the participative movie can decide and create these properties.

If a user loads 964 the participative movie from the participative movie media, purchased or rented, the information about the replaceable actor images and their properties 950 are loaded to the PMF system. The PMF system is an external/internal movie play and record system, connected to the means for processing and controlling 112, which supports the participative movie format 951 in a PMF media 902, such as the PMF optical videodisc, the PMF videotape, or the PMF movie file along with the conventionally known movie formats in conventionally known media 903, such as the DVD disc, the VHS videotape, the MPEG movie file, or any standard movie media.

The properties are compared with the attributes of the users' images and attributes 972, stored in the user image and attribute database 970, which are classified by the demographic classification 371 module, and the best matching replaceable actor images are matched 914 with the corresponding users' images. One way to match these two images can be matching the actor IDs in the actor ID lookup table 974 from the loaded replaceable actor image and property database 973 and the user IDs from the User ID generation module 911. The participative movie media will let the users know the maximum number of available replaceable actors' images and properties per the participative movie. Therefore, if there are more users' images, they can be discarded. On the contrary, if there are more replaceable actors' images and properties, then default actor images can be played 922 and no image replacement will happen for these extra replaceable actors' image and properties.

The content creator of particular embodiment of the invention can decide the field of each database record. For example, the records in the exemplary embodiment of the Replaceable actor image and property database 973, the Actor ID lookup table 974, the User image and attribute database 970, and Actor and User Matching list 975 as shown in FIG. 6 and FIG. 7 can have different type and number of fields. By changing the number of fields in the records, the embodiment can dynamically customize and extend the capability of the media and system.

If the user does not want to use the automatic matching, the person can manually select the replaceable actors' images displayed 913 on the selection menu for the available replaceable actors' images through the user interactive selection 441 method with the interaction interfaces.

In the previous exemplary embodiment shown in FIG. 4, once the replaceable actors' images and the replacing users' images are decided and matched 914, a new movie can be created 953 by the system, which could be called as the user-participated movie, through the user image immersion 360 to the participative movie and its media. However, in this exemplary embodiment shown in FIG. 5, the creation of the movie does not happen beforehand. The invention matches 914 the images and immerses 360 the users' images into the participative actors' images and plays 922 the movie in real-time. The creation of the movie can be done optionally in the background process, while the movie is playing 922, as long as the processor is able to support the feature. The creation of the movie can also be done optionally after the movie play completes by storing the scenes in a temporary storage space, as long as the embodiment of the invention has enough storage space. The newly created user-participated movie can have any standard movie format, such as VHS video format or DVD disc format. Thus, it can be played 922 with any conventional movie player, which supports the standard movie format. The embodiment of the invention can also print the screen shots of the immersed video images, if the user chooses to do so.

In this real-time matching 914 and immersion 360 embodiment, the invention tracks 301 the users and gets new images for them. The User IDs are generated 910 newly through the User ID generation module 911 in a predefined interval. Once a user ID for a user image and attribute is generated 910, the invention can go back to the initial state or audition state in order to process next user by restarting the face detection 300 for a new user.

If the participative movie also supports dynamic content adjustment 920, the user can also change the storyline of the participative movie by selecting the storyline what he or she wants through a user interaction 410, within the available content selection options, provided by the participative movie. The ending style of the movie, either happy ending or sad ending, background of particular movie scenes, type of the automobile the main actor rides in the movie, color of actors' hair, sound-track music, special sound effects, or any movie contents, which can be varied, can be examples of the adjustable movie content in the participative movie. This feature virtually enables the user become a movie director and create a new movie of his or her own, by varying the movie contents and compositing them in the final user-participated movie creation. In order to support this feature the participative movie could have bigger size than the conventional one single storyline movie. The content creator for the participative movie will decide how many different storylines or personalize-able content options to give to each participative movie. Thus, the content creator for the participative movie can provide the seamless flow of playing 922 the newly created user-participated movie.

However, in this real-time creation and running embodiment, the content customization will be accomplished in cooperation with the system's runtime situation. For example, the newly changed content cannot be shown right away, but it will be shown in the next chapter of the movie. If the current content from the current chapter of the user-participated movie cannot be seamlessly connected to the newly customized content for the next chapter of the user-participated movie, the new customization could be discarded.

Figure 8A:
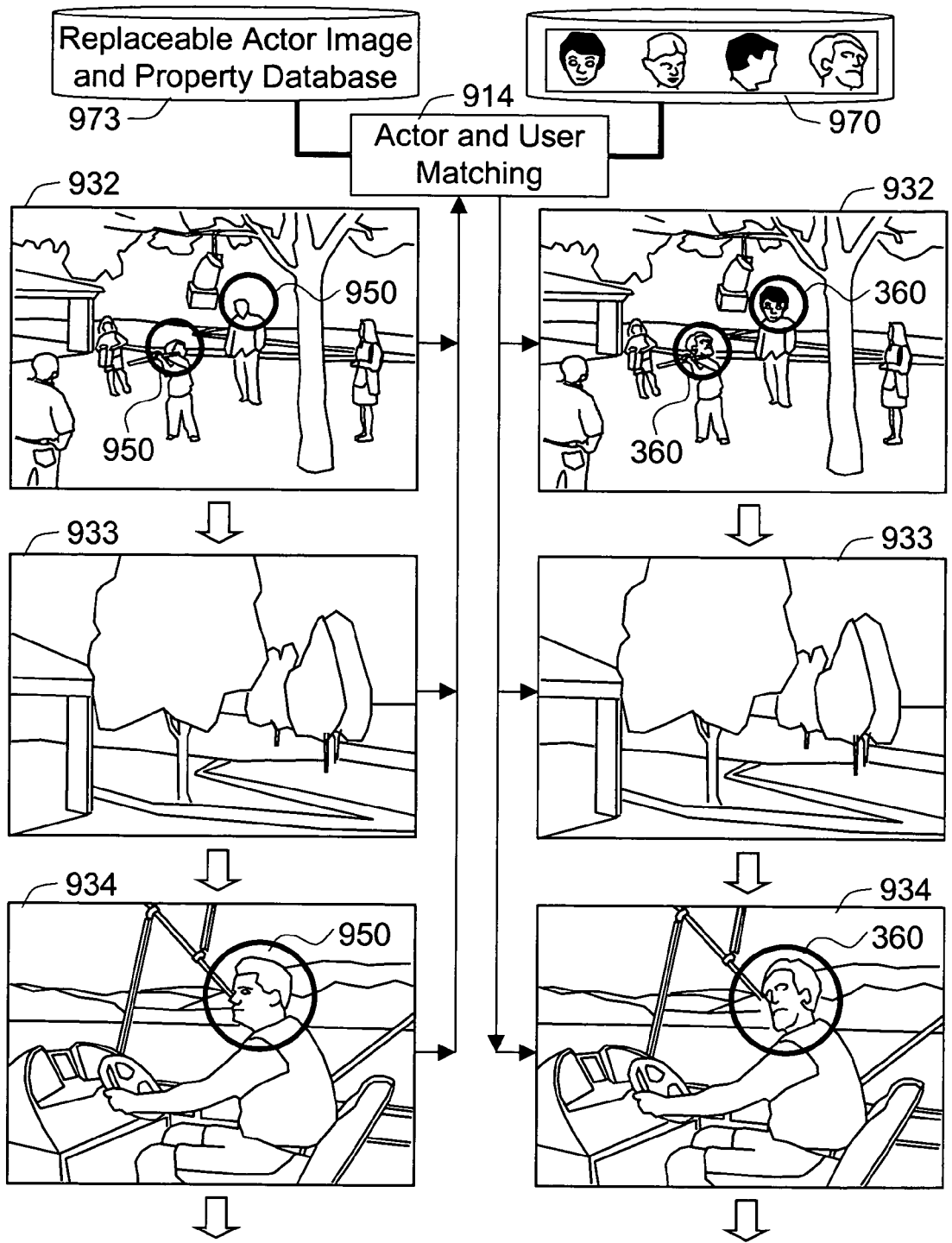
FIG. 8A and FIG. 8B show exemplary screen shots of the movie for Actor and User Matching process and User Image Immersion process in the invention.
Figure 8B:
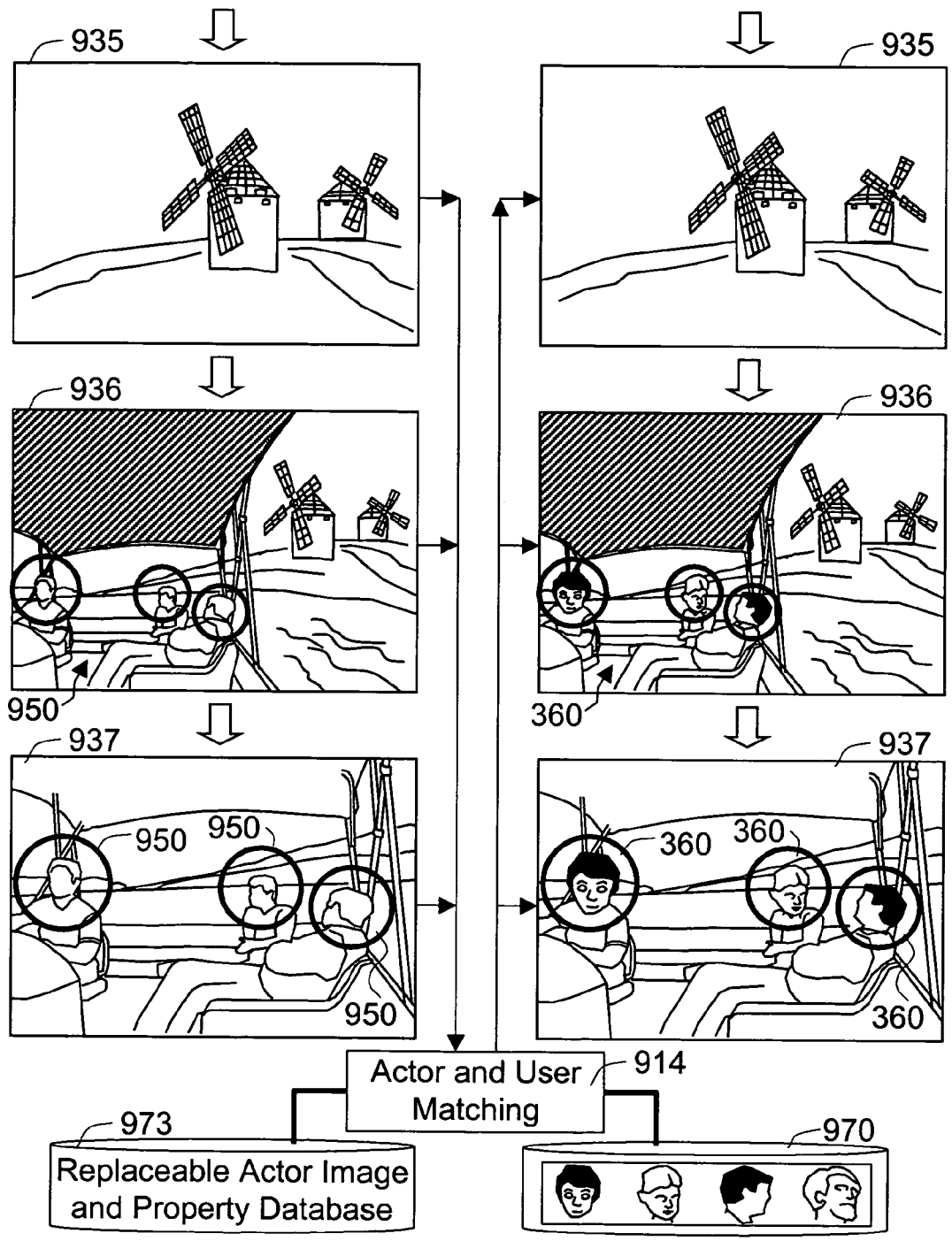

FIG. 8A and FIG. 8B show exemplary screen shots of the movie for Actor and User Matching process and User Image Immersion process in the invention.

As in the exemplary screen shots, 932, 934, 936, 937, shown in FIG. 8A and FIG. 8B, the replaceable actors' images in the participative movie are replaced by the users' images in the list of users' images and attributes 972 in the database 970, through the actor and user matching process. As in the exemplary screen shots, 933, 935, shown in FIG. 8A and FIG. 8B, the screen shots without the replaceable actors' images are left as they are, unless they are designed to be controllable and customizable contents as described above.

In the invention, there are two different groups of graphical objects, such as dynamic graphical objects and static graphical objects. Dynamic graphical objects are defined to be the graphical objects, which can be influenced by the user's interaction, and it is further divided into two groups, such as replaceable graphical objects and controllable graphical objects.

Replaceable graphical objects are defined to be the graphical objects, which can be replaced by the user's image, such as the replaceable actors' images.

There are also some dynamic graphical objects, which can be controlled by the user's body motion. They are called controllable graphical object in the invention. For example, the handle of the boat in FIG. 8A and the nature scenery behind the boat in FIG. 8B are the examples of the controllable graphical objects. All these images interactively change the position or shape, on the means for displaying contents 111, while the user moves.

Static graphical objects are the graphical objects, which do not change whatsoever, such as the trees and pavilion images in the exemplary screen shots 933, 935 shown in FIG. 8A and FIG. 8B.

The information about these dynamic and static graphical objects is stored in the participative video, and it is loaded at the initial running of the system. The controlling and processing system in the invention dynamically changes the composite of the images in the runtime, responding to the user's interaction.

Figure 9:
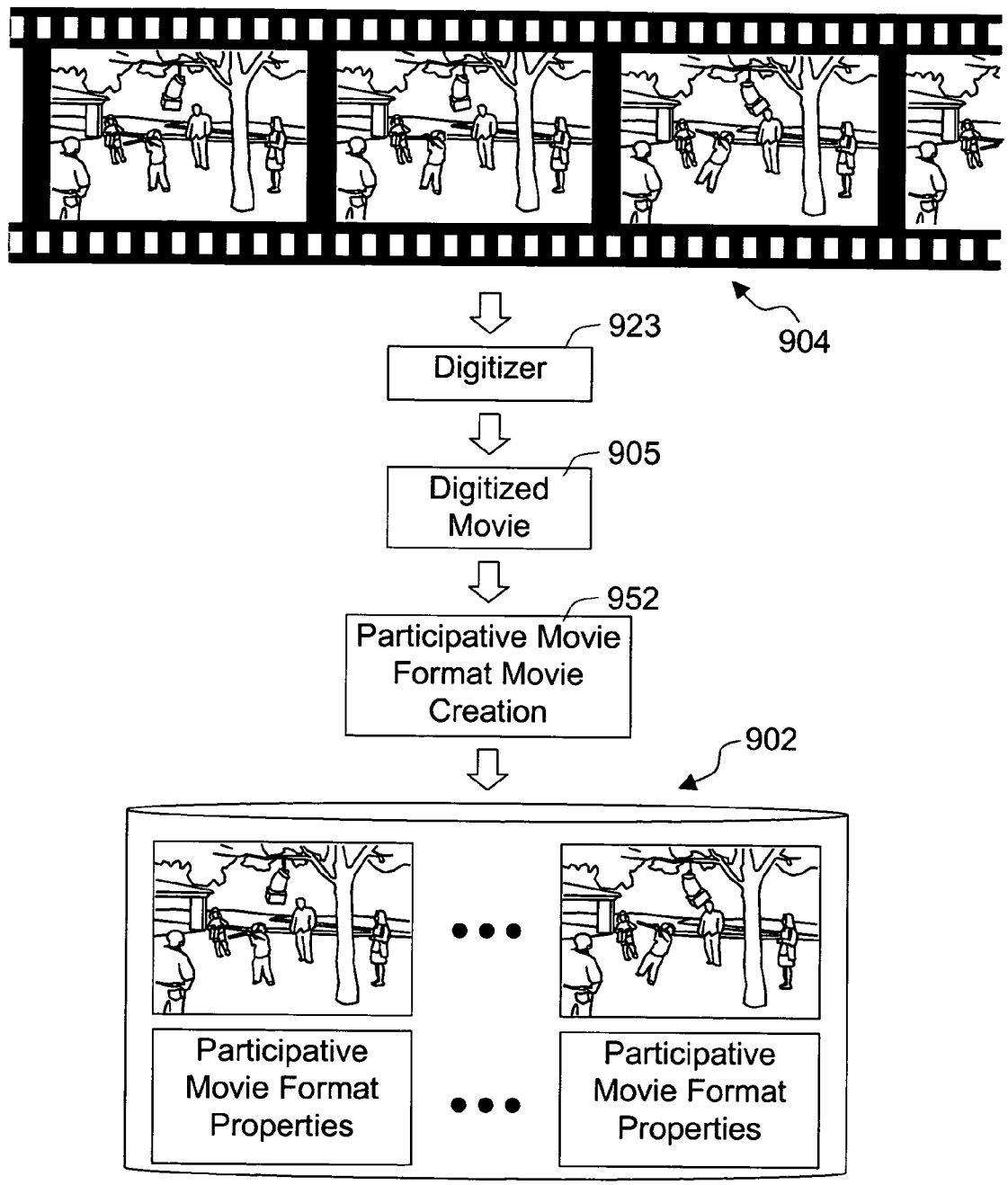
FIG. 9 shows an exemplary embodiment of participative movie format movie creation from analog movie media.

FIG. 9 shows an exemplary embodiment of participative movie format movie creation from analog movie media. As shown in the exemplary embodiment in FIG. 9, not only any digital movie media but also any analog movie media 904 can be used to create the participative movie format movie in the invention. After a digitizer 923 digitize the movie, the digital movie 905 is combined with the information about the participative movie format properties and a PMF movie is created 952. Any conventionally known digital and non-digital movie formats in conventionally known media, such as the DVD disc, the VHS videotape, the MPEG movie file, or any standard movie media, can be converted to a PMF movie by combining the movie media with the information about the participative movie format properties.

While the invention has been illustrated and described in detail, in the drawings and foregoing description, such an illustration and description is to be considered as exemplary and not restrictive in character, it being understood that only the preferred embodiment has been shown and described and that all changes and modifications that come within the spirit of the invention are desired to be protected.

We claim:

1. A method, comprising:
   receiving a plurality of input images;
   extracting one or more facial images from the plurality of input images using a computer system;
   generating, at the computer system, demographic classifications using the plurality of input images;
   replacing at least one replaceable actor image in a video sequence with at least one of the plurality of input images based on the demographic classifications; and
   creating a movie based on the replaced at least one replaceable actor image.

2. The method according to claim 1, further comprising receiving the one or more facial images automatically from one or more images.

3. The method according to claim 1, wherein receiving the plurality of input images comprises receiving at least one image from a scanned photograph.

4. The method according to claim 1, further comprising storing the at least one replaceable actor image using a participative movie format.

5. The method according to claim 1, wherein generating the demographic classifications using the plurality of input images comprises generating demographic classifications using an extracted facial image of the one or more extracted facial images.

6. The method according to claim 5, further comprising matching the one or more facial images with the at least one replaceable actor image, according to the demographic classifications.

7. The method according to claim 1, further comprising playing the movie in real-time.

8. The method according to claim 1, further comprising changing content in the movie based on a controllable graphical object.

9. The method according to claim 8, further comprising synchronizing dynamic content adjustment to give seamless flow of playing the movie.

10. The method according to claim 1, further comprising:
storing the one or more facial images in a database; and
retrieving a facial image of the stored one or more facial images from the database for use as an input image.

11. The method according to claim 1, further comprising retrieving the at least one of the replaceable actor image from a database.

12. The method according to claim 1, further comprising printing one or more screen shots of the created movie.

13. The method according to claim 1, further comprising: showing visual information and instruction about creating the movie.

14. The method according to claim 1, wherein extracting the one or more facial images comprises extracting the one or more facial images in real-time.

15. The method according to claim 1, wherein extracting the one or more facial images comprises extracting the one or more facial images against an uncontrolled background.

16. An apparatus, comprising:
means for capturing a plurality of input images;
means for extracting one or more facial images from the plurality of input images;
means for generating demographic classifications using the plurality of input images;
means for replacing at least one replaceable actor image in a video sequence with at least one of the plurality of input images based on the demographic classifications; and
means for creating a movie based on the replaced at least one replaceable actor image.

17. The apparatus according to claim 16, further comprising means for receiving the one or more facial images automatically from one or more images.

18. The apparatus according to claim 16, further comprising means for receiving at least one image of the plurality of input images from a scanned photograph.

19. The apparatus according to claim 16, further comprising means for storing the at least one replaceable actor image using a participative movie format.

20. The apparatus according to claim 19, wherein the means for creating the movie comprises means for creating the movie using the participative movie format and
wherein the apparatus further comprises means for playing the movie created using the participative movie format.

21. The apparatus according to claim 16, wherein the means for generating the demographic classifications using the plurality of input images comprises means for generating demographic classifications using an extracted facial image of the one or more extracted facial images.

22. The apparatus according to claim 16, further comprising means for matching the one or more facial images with the at least one replaceable actor image, according to the demographic classifications.

23. The apparatus according to claim 16, further comprising means for playing the movie in real-time.

24. The apparatus according to claim 16, further comprising means for changing content in the movie based on a controllable graphical object.

25. The apparatus according to claim 24, further comprising means for enabling dynamic content adjustment to be synchronized to give seamless flow of playing the movie.

26. The apparatus according to claim 16, further comprising:
means for storing the one or more facial images in a database; and
means for retrieving a facial image of the stored one or more facial images form the database for use as an input image.

27. The apparatus according to claim 16, further comprising means for retrieving the at least one replaceable actor image from a database.

28. The apparatus according to claim 16, further comprising means for printing one or more screen shots of the created movie.

29. The apparatus according to claim 16, further comprising means for showing visual information and instruction.

30. The apparatus according to claim 16, wherein the means for extracting the one or more facial images comprises means for extracting the one or more facial images in real-time.

31. The apparatus according to claim 16, wherein the means for extracting the one or more facial images comprises means for extracting the one or more facial images against an uncontrolled background.

* * * * *

UNITED STATES PATENT AND TRADEMARK OFFICE
CERTIFICATE OF CORRECTION

PATENT NO. : 7,734,070 B1  Page 1 of 1
APPLICATION NO. : 10/738453
DATED : June 8, 2010
INVENTOR(S) : Rajeev Sharma et al.

It is certified that error appears in the above-identified patent and that said Letters Patent is hereby corrected as shown below:

In the Claims:

Claim 26, column 18, line 37, delete "form" and replace with --from--.

Signed and Sealed this

Thirty-first Day of August, 2010

David J. Kappos
*Director of the United States Patent and Trademark Office*